United States Patent
Hood et al.

(10) Patent No.: US 8,614,030 B2
(45) Date of Patent: Dec. 24, 2013

(54) FUEL CELL DIRECT WATER INJECTION

(75) Inventors: Peter D. Hood, Leicester (GB); Paul L. Adcock, Leicestershire (GB)

(73) Assignee: Intelligent Energy Limited, Loughborough (GB)

( * ) Notice: Subject to any disclaimer, the term of this patent is extended or adjusted under 35 U.S.C. 154(b) by 1366 days.

(21) Appl. No.: 10/520,579

(22) PCT Filed: Jul. 9, 2003

(86) PCT No.: PCT/GB03/02973
§ 371 (c)(1),
(2), (4) Date: Oct. 3, 2005

(87) PCT Pub. No.: WO2004/006367
PCT Pub. Date: Jan. 15, 2004

(65) Prior Publication Data
US 2006/0154130 A1   Jul. 13, 2006

(30) Foreign Application Priority Data
Jul. 9, 2002   (GB) .................................. 0215790.7

(51) Int. Cl.
H01M 8/06   (2006.01)
H01M 2/38   (2006.01)
H01M 2/40   (2006.01)
H01M 8/24   (2006.01)
H01M 8/04   (2006.01)

(52) U.S. Cl.
USPC .............................. 429/514; 429/413; 429/457

(58) Field of Classification Search
USPC .............................. 429/38, 39, 413, 457, 514
See application file for complete search history.

(56) References Cited

U.S. PATENT DOCUMENTS

| | | | |
|---|---|---|---|
| 5,998,054 A * | 12/1999 | Jones et al. ..................... | 429/34 |
| 6,066,408 A * | 5/2000 | Vitale et al. .................... | 429/26 |
| 6,303,245 B1 * | 10/2001 | Nelson ............................ | 429/34 |
| 6,528,198 B1 | 3/2003 | Jones et al. | |
| 7,435,501 B2 | 10/2008 | Peace et al. | |
| 7,498,094 B2 | 3/2009 | Hood et al. | |
| 2002/0086195 A1 | 7/2002 | Gorman et al. | |

(Continued)

FOREIGN PATENT DOCUMENTS

| | | |
|---|---|---|
| EP | 1184924 | 3/2002 |
| GB | 2390738 | 5/2005 |
| WO | WO02/05373 | 1/2002 |

OTHER PUBLICATIONS

Search Report for corresponding Application GB0215790.7, dated Sep. 25, 2003.

(Continued)

*Primary Examiner* — Eugenia Wang
(74) *Attorney, Agent, or Firm* — Fish & Richardson P.C.

(57) ABSTRACT

A fuel cell assembly provides for direct water delivery to water injection points in the active area of fluid flow field plates of the assembly. The fluid flow field plate has a plurality of channels formed in the surface thereof which extend across the surface of the plate in a predetermined pattern, defining the active areas of the plate. A distribution foil has a plurality of channels formed in a surface thereof which channels extend from a first edge of the distribution foil to a second edge of the distribution foil. The channels terminate at the second edge at positions substantially coincident with respective ones of the field plate channels at water injection points. A cover foil extends over the distribution foil to enclosed the distribution foil channels and thereby form conduits for the water between the two foils.

14 Claims, 7 Drawing Sheets

(56) References Cited

U.S. PATENT DOCUMENTS

| | | |
|---|---|---|
| 2003/0064266 A1 | 4/2003 | Ogami et al. |
| 2003/0091887 A1 | 5/2003 | Honen et al. |
| 2005/0048351 A1 | 3/2005 | Hood et al. |
| 2005/0106445 A1 | 5/2005 | Mitchell et al. |
| 2005/0202304 A1 | 9/2005 | Peace et al. |
| 2006/0257699 A1 | 11/2006 | Hood et al. |
| 2006/0292429 A1 | 12/2006 | Baird et al. |
| 2007/0166596 A1 | 7/2007 | Benson |
| 2008/0145738 A1 | 6/2008 | Benson |
| 2008/0248336 A1 | 10/2008 | Matcham et al. |
| 2008/0314660 A1 | 12/2008 | Davies et al. |
| 2009/0029231 A1 | 1/2009 | Hood et al. |

OTHER PUBLICATIONS

International Search Report for Application No. PCT/GB03/02973.
Examination Report in Application No. GB0215790.7, dated Sep. 29, 2004.
Response to Examination Report in Application No. GB0215790.7, dated Mar. 21, 2005.
Examination Report in Application No. CN03821341.9, dated Jan. 26, 2007.
Response to Examination Report in Application No. CN03821341.9, dated Jun. 11, 2007.
Summary of Interview with Examiner in Russian Application No. 2005103229, dated Aug. 28, 2006.
Examination Report in Application No. SG200500103-7, dated Aug. 5, 2005.
Response to Examination Report in Application No. SG200500103-7, dated Nov. 22, 2005.
Examination Report in Canadian Application No. 2,492,109, dated Apr. 21, 2010.
English Translation of Notification of Reason for Refusal in Japanese Application No. 2004-519011, dated Jun. 16, 2010.
Notification of Reason for Refusal in Japanese Application No. 2004-519011, dated Jun. 8, 2010.

* cited by examiner

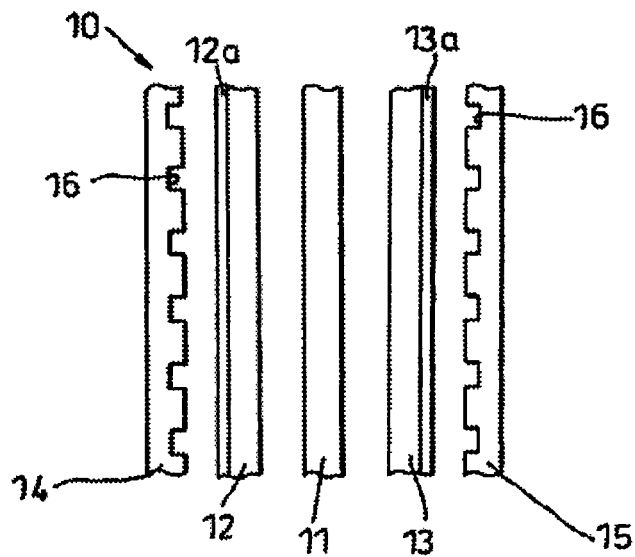
Fig. 1
*(PRIOR ART)*
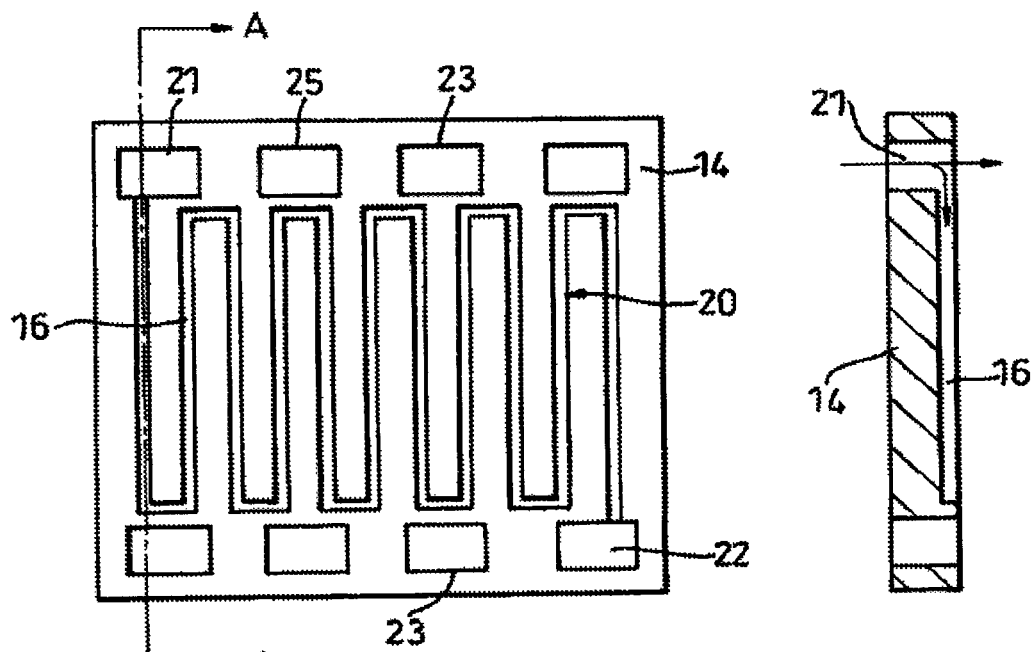
Fig. 2(a)
*(PRIOR ART)*
Fig. 2(b)
*(PRIOR ART)*

FUEL CELL DIRECT WATER INJECTION

This patent application is a national stage application of PCT application no. PCT/GB03/02973, which claims priority to GB02157907. This patent application claims priority to both PCT/GB03/02973 and to GB02157907.

TECHNICAL FIELD

The present invention relates to fuel cells, and in particular to flow field plates suitable for use in solid polymer electrolyte fuel cells, which flow field plates act as fluid delivery conduits to electrode surfaces of the fuel cell.

BACKGROUND

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15. Intermediate backing layers 12a and 13a may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water. Throughout the present specification, references to the electrodes (anode and/or cathode) are intended to include electrodes with or without such a backing layer.

The fluid flow field plates 14, 15 are formed from an electrically conductive, non-porous material by which electrical contact can be made to the respective anode electrode 12 or cathode electrode 13. At the same time, the fluid flow field plates must facilitate the delivery and/or exhaust of fluid fuel, oxidant and/or reaction product to or from the porous electrodes. This is conventionally effected by forming fluid flow passages in a surface of the fluid flow field plates, such as grooves or channels 16 in the surface presented to the porous electrodes 12, 13.

With reference also to FIG. 2(a), one conventional configuration of fluid flow channel provides a serpentine structure 20 in a face of the anode 14 (or cathode 15) having an inlet manifold 21 and an outlet manifold 22 as shown in FIG. 2(a). According to conventional design, it will be understood that the serpentine structure 20 comprises a channel 16 in the surface of the plate 14 (or 15), while the manifolds 21 and 22 each comprise an aperture through the plate so that fluid for delivery to, or exhaust from, the channel 20 can be communicated throughout the depth of a stack of plates in a direction orthogonal to the plate as particularly indicated by the arrow in the cross-section on A-A shown in the FIG. 2(b).

Other manifold apertures 23, 25 may be provided for fuel, oxidant, other fluids or exhaust communication to other channels in the plates, not shown.

The channels 16 in the fluid flow field plates 14, 15 may be open ended at both ends, ie. the channels extending between an inlet manifold 21 and an outlet manifold 22 as shown, allowing a continuous throughput of fluid, typically used for a combined oxidant supply and reactant exhaust. Alternatively, the channels 16 may be closed at one end, ie. each channel has communication with only an input manifold 21 to supply fluid, relying entirely on 100% transfer of gaseous material into and out of the porous electrodes of the MEA. The closed channel may typically be used to deliver hydrogen fuel to the MEA 11-13 in a comb type structure.

With reference to FIG. 3, a cross-sectional view of art of a stack of plates forming a conventional fuel cell assembly 30 is shown. In this arrangement, adjacent anode and cathode fluid flow field plates are combined in conventional manner to form a single bipolar plate 31 having anode channels 32 on one face and cathode channels 33 on the opposite face, each adjacent to a respective membrane-electrode assembly (MEA) 34. The inlet manifold apertures 21 and outlet manifold apertures 22 are all overlaid to provide the inlet and outlet manifolds to the entire stack. The various elements of the stack are shown slightly separated for clarity, although it will be understood that they will be compressed together using sealing gaskets if required.

In order to obtain high and sustained power delivery capability from a fuel cell, it is generally necessary to maintain a high water content within the membrane-electrode assembly, and in particular within the membrane.

In the prior art, this is conventionally achieved by humidifying the feed gases, either fuel, air or both, fed via manifolds 21, 22 or 23 and channels 16. A disadvantage with this technique is that in order to maintain sufficient humidification levels, the inlet gas streams often require heating and supplementary apparatus to introduce water vapour into the flowing gas streams.

In the prior art, the supplementary apparatus has been implemented in a number of ways. Bubbling the fuel or oxidant gases through heated water columns prior to introduction into the fuel cell has been applied. Alternatively, permeable membranes have been utilised as water transfer media such that water is carried into a gas stream from an adjacent plenum containing liquid water. Wicks have similarly been adopted to act as water transport media, liquid to vapour phase.

The additional apparatus may be separate from, or form an integral part of, the fuel cell stack. In either case, there is an associated increase in size and complexity of the assembly as a whole.

An alternative method is to deliver water directly to the membrane 11, 34, eg. directly to the electrode surfaces or into the channels 16 of the bipolar plates 31. This technique has the advantage of not only supplying the water to maintain a high membrane water content but also can act to cool the fuel cell through evaporation and extraction of latent heat of vaporisation.

This direct heat removal process that provides for the extraction of energy via the exit gas stream has distinct advantages associated with the elimination of intermediate cooling plates within the fuel cell stack assembly.

In the prior art, it is common to adopt a cooling regime which intersperses heat exchange plates between the electrochemically active plates so as to extract the thermal energy resulting from resistive and thermodynamic inefficiency of the fuel cell. These heat exchange, or cooling, plates utilise a recirculating or, less commonly, once-through fluid flow which carries heat away from the fuel cell stack. The cooling plates are in general of a different design to the active plates thereby adding to the complexity, size and cost of the fuel cell assembly.

A difficulty that can be encountered in the direct introduction of water is to deliver precise quantities of water to the many fluid flow fuel plate channels 16 within a fuel cell stack 30. Typically, this requires the delivery of precise quantities of water to many thousands of individual locations. To achieve this, a complex design of fluid flow field plate 14, 15 or 31 is required, which is more difficult to achieve and which increases costs of production.

If the water delivery process is uneven then the cooling effect can be poorly distributed, resulting in localised hot spots where overheating may result in physical stress and a deterioration of the membrane 11 mechanical properties and ultimately rupture. This effect applies with both poor (uneven) delivery across a plate surface and uneven delivery to each of the individual cells that make up the stack. In other words, temperature variations mail occur within a cell, or from cell to cell.

SUMMARY

It is an object of the present invention to provide an improved method and apparatus for controlled delivery of water to individual channels in the fluid flow plates. It is a further object of the invention to provide such a method and apparatus which is easy to manufacture and assemble.

According to one aspect, the present invention provides a fuel cell assembly comprising:
- a fluid flow field plate having a plurality of channels formed in the surface thereof and extending across the surface of the plate in a predetermined pattern;
- a distribution foil having a plurality of channels formed in a surface thereof and extending from a first edge of the distribution foil to a second edge of the distribution foil, the channels terminating at the second edge at positions substantially coincident with respective ones of the field plate channels; and
- a cover foil extending over the distribution foil to enclose the distribution foil channels and thereby form conduits for water between the two foils.

According to another aspect, the present invention provides a fuel cell assembly comprising:
- a fluid flow field plate hating a plurality of channels formed in the surface thereof and extending across the surface of the plate in a predetermined pattern;
- a distribution foil having a plurality of channels formed in a surface thereof, the channels each extending from first positions proximal to or at a first edge of the distribution foil to second positions proximal to or at a second edge of the distribution foil, the channels terminating at the second positions substantially coincident with respective ones of the underlying plate channels; and
- a cover foil co-extensive with a substantial part of the distribution foil to enclose the distribution foil channels over at least part of their length between the first and second positions and thereby form conduits for water between the two foils.

According to a further aspect, the present invention provides a fuel cell assembly comprising:
- a fluid flow field plate having a plurality of channels formed in the surface thereof and extending across the surface of the field plate in a predetermined pattern;
- an adjacent membrane-electrode assembly (MEA) in contact with the fluid flow field plate over an active area of the MEA and;
- a distribution membrane interposed between the fluid flow field plate and the MEA, the membrane having a plurality of water conduits extending therethrough between first positions proximal to or at a first edge of the membrane to second positions proximal to or at a second edge of the membrane, the conduits terminating at the second positions substantially coincident with respective ones of the plate channels.

DESCRIPTION OF THE DRAWINGS

Embodiments of the present invention will now be described by way of example and with reference to the accompanying drawings in which:

FIG. 1 shows a schematic cross-sectional view through a part of a conventional fuel cell;

FIGS. 2(a) and 2(b) respectively show a simplified plan and sectional view of a fluid flow field plate of the fuel cell of FIG. 1;

DETAILED DESCRIPTION

Figure 3:
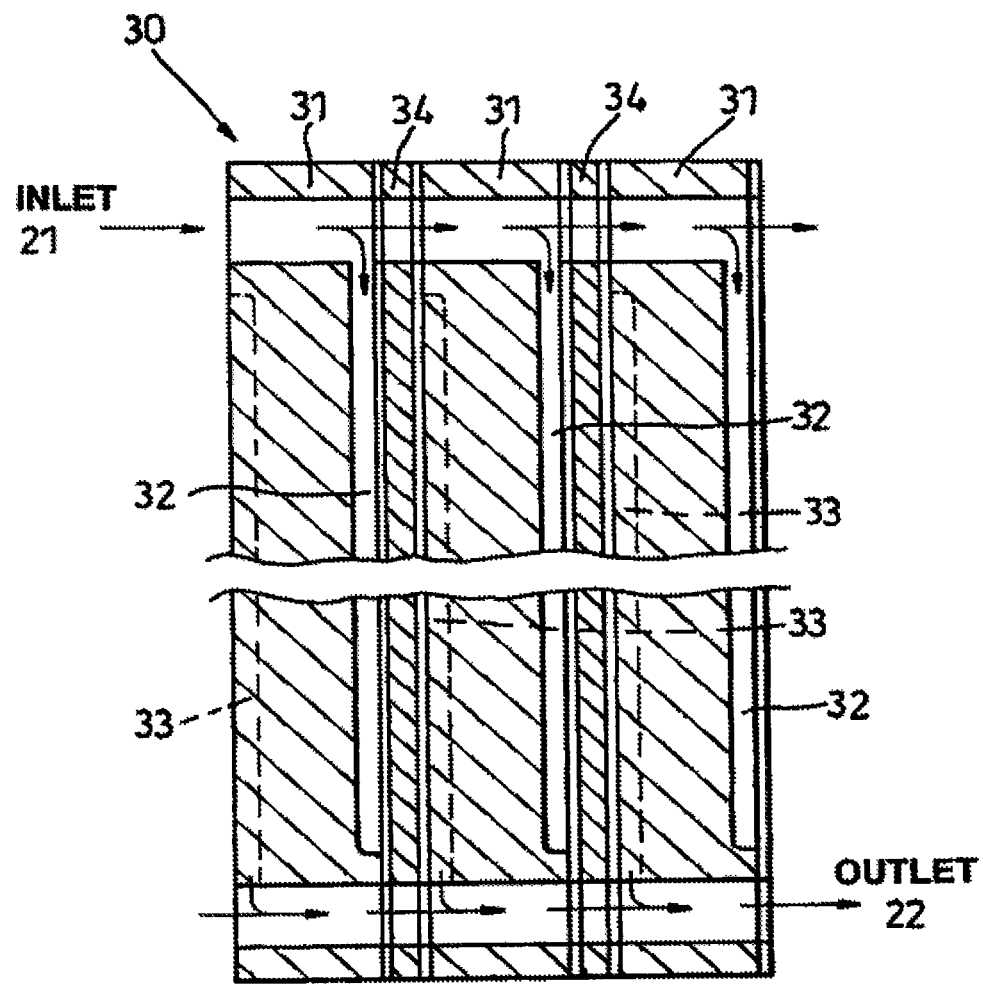
FIG. 3 shows a cross-sectional view through a conventional fuel cell stack with bipolar plates.
Figure 4A:
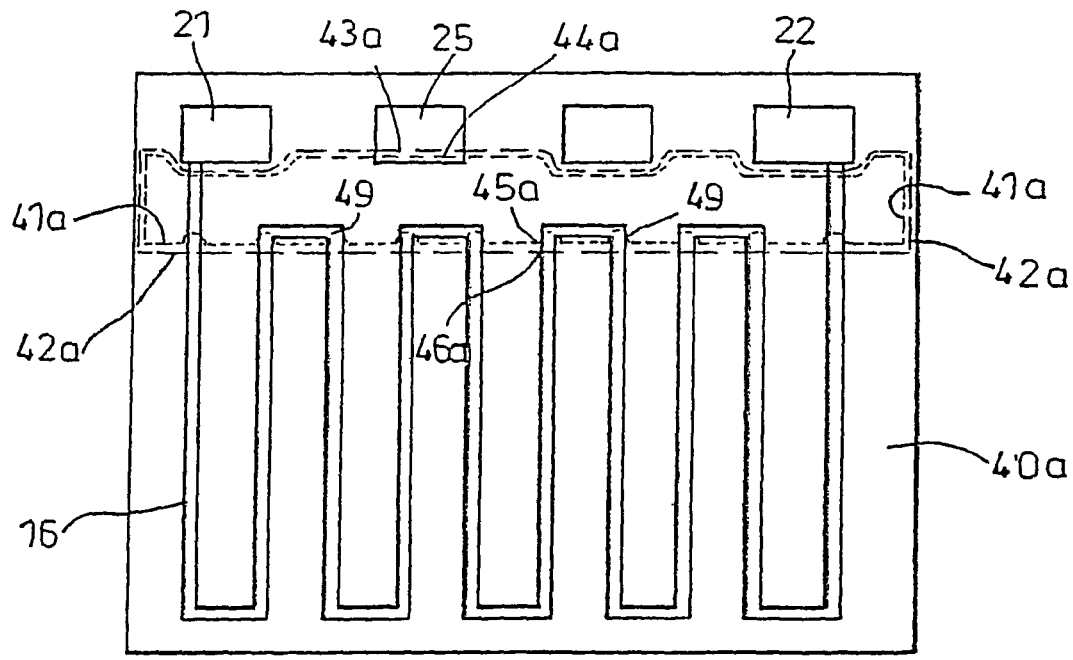
FIG. 4(a) shows a plan view of a fuel cell fluid flow field plate with a serpentine fluid conduit, showing in outline the overlay position of a water distribution foil and cover foil according to the present invention.
Figure 4B:
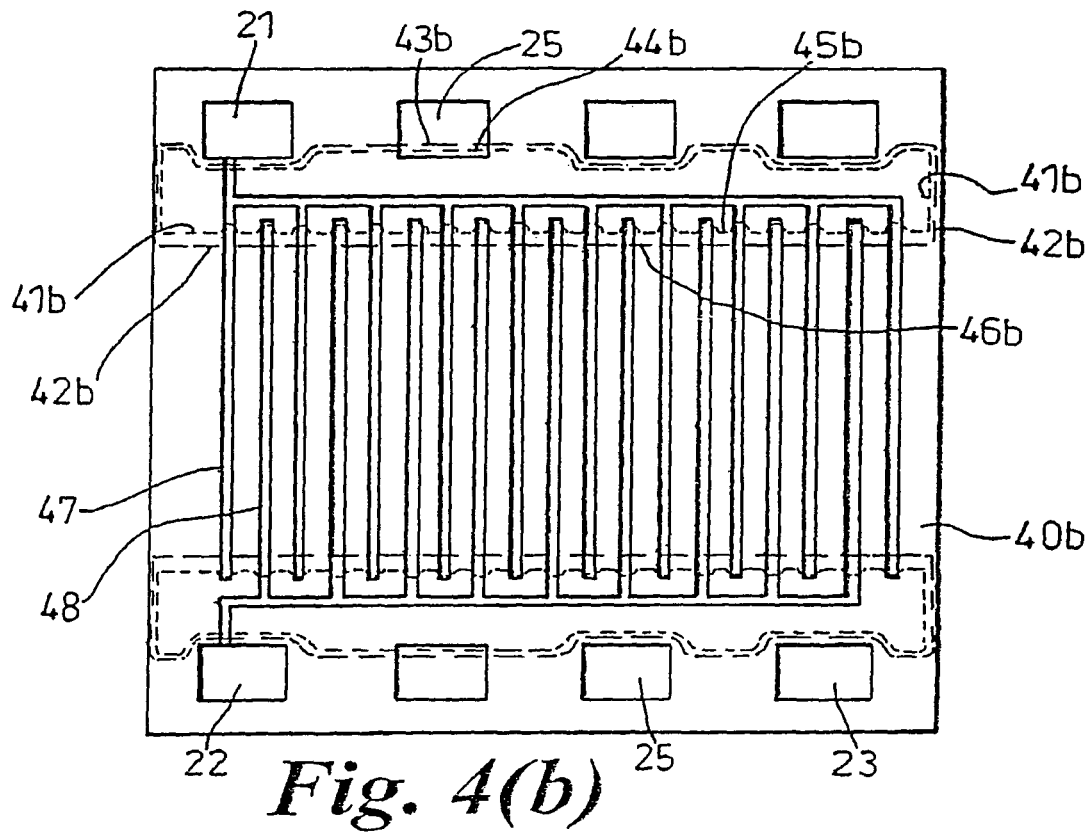
FIG. 4(b) shows a plan view of a fuel cell fluid flow field plate with interdigitated comb fluid conduit, showing in outline the overlay position of a water distribution foil and cover foil according to the present invention.

With reference to FIGS. 4(a) and 4(b), the present invention provides a series of water injection conduits extending between a water inlet manifold 25 and the individual channels 16 of a fluid flow field plate 40a or 40b. Generally speaking, the water injection conduits are provided by way of a membrane or laminated structure which lies on the surface of the fluid flow field plate 40. The water injection conduits are provided with inlets communicating with the water inlet manifold 25 and outlets which define predetermined water injection points over the channels 16 in the fluid flow field plate.

In a preferred arrangement, the laminated structure is provided in the form of two foil layers 41, 42 overlying the plate 40, the position of which foils are shown in dashed outline in FIGS. 4(a) and 4(b).

FIG. 4(a) illustrates a plan view of a fluid flow field plate 40a with serpentine channel 16, with foils 41a, 42a having first edges 43a, 44a coincident with the water inlet manifold 25, and second edges 45a, 46a located at or adjacent to predetermined water injection points 49 of the channels 16.

FIG. 4(b) illustrates a plan view of a fluid flow field plate 40b with two interdigitated comb channels 47, 48 each communicating with a respective manifold 21, 22, and foils 41b, 42b having first edges 43b, 44b coincident with the water inlet manifold 25, and second edges 45b, 46b located at or adjacent to predetermined water injection points of the channel 47. It will be noted that the foils may be repeated on the opposite edge of the plate 40b between a second water inlet manifold 25 and predetermined water injection points on the channel 48.

Figure 5:
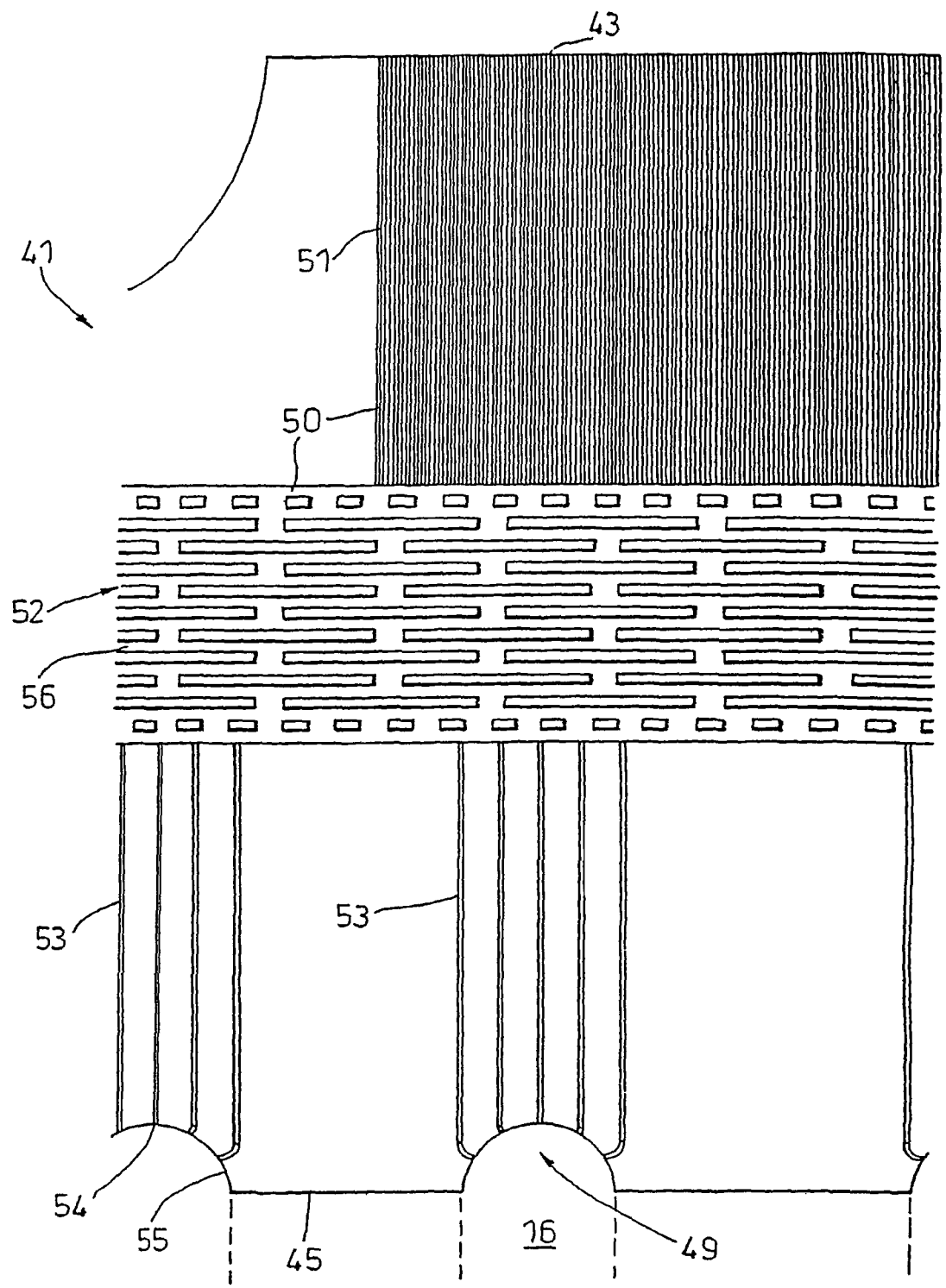
FIG. 5 shows a plan view of a water distribution foil according to the present invention.

FIG. 5 shows a detailed plan view of the water distribution foil 41 layout, illustrating the preferred paths of the water injection conduits 50. The conduits 50 are formed by a first series of channels 51 which extend from the first edge 43 of the foil 41 located at the water inlet manifold 25, to a pressure distribution gallery or plenum 52 that extends along the length of the water injection foil 41. The pressure distribution gallery 52 communicates with a second series of channels 53 which extend to the second edge 45 of the foil for communication with the channels 16 in the fluid flow field plate. For this purpose, the second series of channels 53 are grouped to terminate at respective convergence structures 54 at the second edge 45 of the water injection foil 41.

In the preferred embodiment as illustrated, the convergence structures 54 comprise arcuate recesses 55 cut into the second edge 45 of the foil 41 at water injection points 49 adapted to be coincident with predetermined positions over channels 16, shown in outline on the figure.

The pressure distribution gallery 52 preferably comprises an array of intercommunicating channels 56 which baffle the incoming water from the first series of channels 51 and effectively distribute it along the entire length of the foil 41 so that each group of the second series of channels 53 receives water at a substantially similar pressure.

Referring back to FIGS. 4(a) and 4(b), the cover foil 42 comprises an unpatterned foil (ie. without channels) of substantially similar peripheral shape to the lower foil. The cover foil 42 extends beyond the edge of the distribution foil 41 at least at the ends of the second series of channels to ensure that water is directed downwards into the desired flow field plate channel 16. Most conveniently, this overlap is achieved by the recesses 55 being formed in the distribution foil 41, but not in the cover foil 42. Thus, as best seen in the cross-sectional diagram of FIG. 6, in exaggerated form, the cover foil 42 forms a top closure to the channels 51, 52 and 53 to form the water injection conduits 50, leaving open the ends of the channels 51 and 53. In the embodiment shown, the cover foil 42 may be formed slightly larger than the distribution foil 41 such that it overlaps the second edge 45 (and possibly the first edge 43) to achieve a similar effect.

Figure 6:
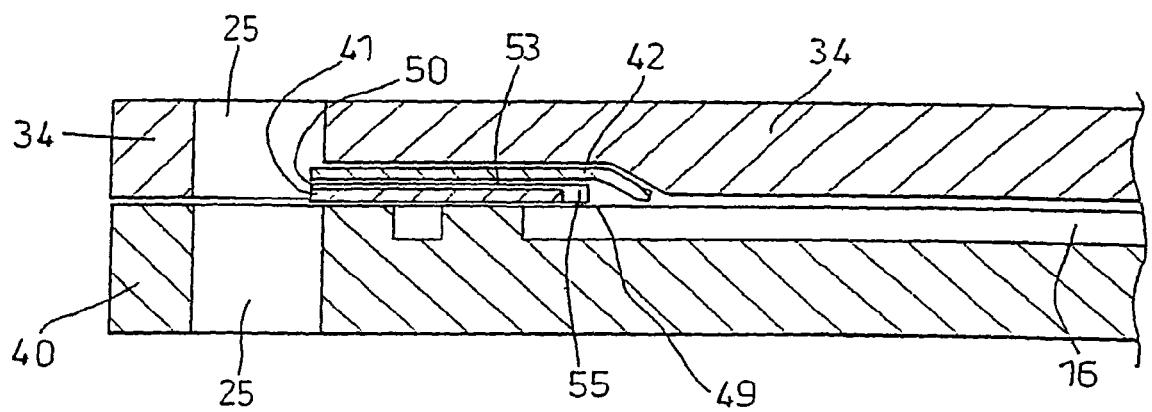
FIG. 6 shows a cross-sectional view of the fluid flow field plate, water distribution foil and cover foil of FIGS. 4 and 5.

It is noted that the foil layers are very thin compared with the plate 40 thickness, the thickness of the foil layers being easily absorbed by the MEA 34 and any gaskets interposed between the plates. The components in the FIG. 6 are shown slightly separated for clarity, although they will, of course, be compressed together.

Figure 7:
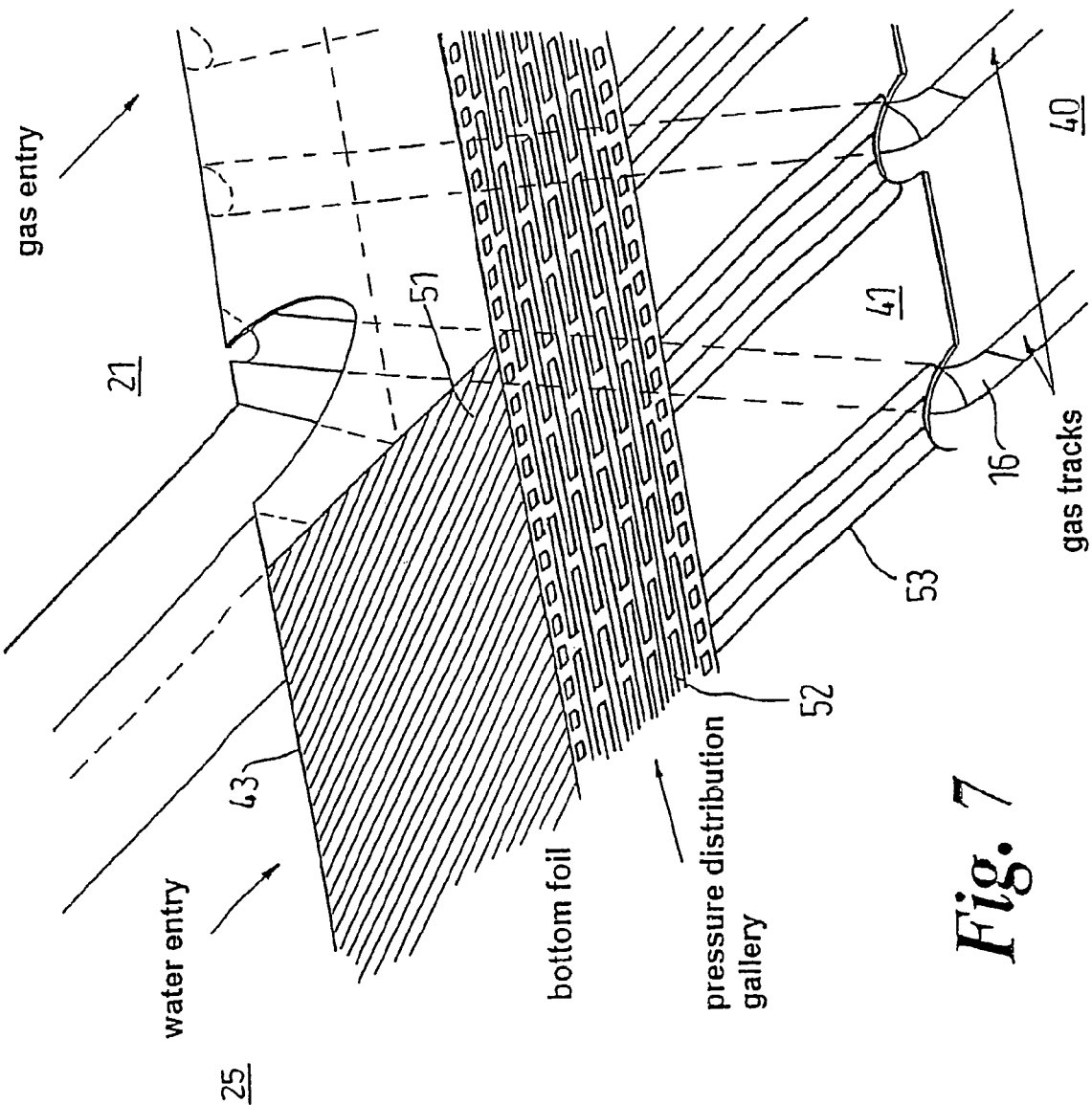
FIG. 7 shows a perspective view of part of the assembly of FIG. 6.

FIG. 7 shows a perspective diagram of the water distribution foil 41 in position over the flow field plate 40 showing alignment of the various channels and manifolds.

It will be recognised that the water distribution channels 51, 52, 53 need not be formed in the lower foil 41. In another embodiment, shown in FIG. 8, the water distribution channels 80 are formed in the lower surface of upper foil 82, while the lower foil 81 serves to form the closure of the channels 80 to form the water injection conduits. In other words, the distribution foil 82 and cover foil 81 are inverted compared with the arrangement of FIG. 6.

Figure 8:
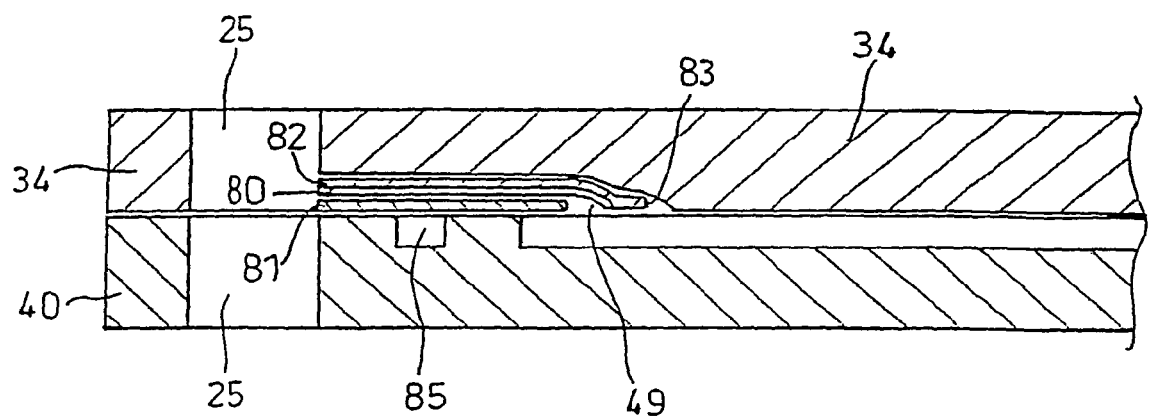
FIG. 8 shows a cross-sectional view of a fluid flow field plate, water distribution foil and cover foil in which the relative positions of the water distribution foil and cover foil are reversed.

In the FIG. 8 arrangement, at least the second series of channels (compare channels 53 in FIG. 5) will not extend right to the second edge 83 of the upper foil, but will terminate at positions proximal to the second edge. The lower (cover) foil 81 will extend almost to the end of the channels 80, but will preferably stop slightly short thereof in order that there is fluid communication from the end of the channel 80 into the plate channel 16 at the water injection points 49.

As indicated above, the lower (cover) foil 81 provides a closure to the channels 80 forming a barrier preventing water from escaping into underlying channels 16 in the fluid flow plate 40 in the wrong places, eg. where the water injection conduits traverse the fuel and/or oxidant channels 16 (eg. at location 85).

Preferably, the foils as described above are formed from a metal, such as stainless steel. However, any suitable material having appropriate pressurised water containment properties could be used, and the expression "foil" used throughout the present specification is to be construed accordingly. Preferably, the foils are electrically conductive but they need not be so, since they do not impinge on the active area of the MEA.

In a preferred embodiment, the fluid flow channels 16 in the anode or cathode plates 40 are tropically between 0.4 mm and 1.2 mm in width and depth. It is found that a channel width and depth of 10 μm, chemically etched into the water distribution foil, selves to provide the necessary degree of water injection.

In use, the pressure of water being delivered via manifold 25 is controlled to ensure a significant pressure difference between the water supply and the gas pressure in the fluid flow channels 16, achieving an equal distribution of water between the thousands of flow paths. In the preferred embodiment, water is delivered to the manifold at a pressure in the range 0.5-3 bar $H_2O$.

An advantage of this approach is that the water distribution membrane is extremely thin and can easily be located within the available space within bipolar plates or in the gasket area.

The volumetric water dispensing accuracy can also be very precisely controlled by suitable design of the water injection conduit pattern and channel dimensions.

The water can be dispensed to either the fuel stream (anode) or the oxidant (cathode) side of the bipolar plate 34, or both. Preferably, the water is injected into the cathode side.

Figure 9:
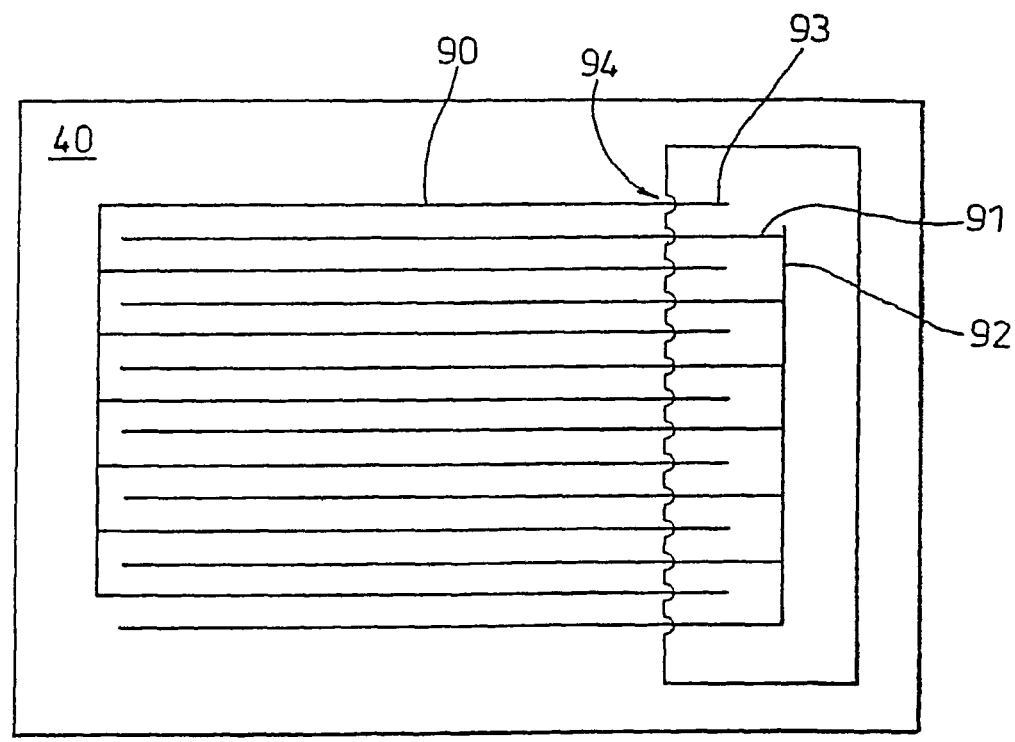
FIG. 9 shows a schematic plan view of water injection points for an interdigitated comb channel structure.

As illustrated in FIG. 9, water that is dispensed into interdigitated channels 90 in the flow field plate 40 can be introduced at either the entry point 91 to the channel, after the feeder channel 92, or alternatively into the exit track 93 at an injection point 94 at the same end of the bipolar plate as the feed manifold.

An advantage of water injection into the exit tracks is a reduction of pressure drop in reactant gas flows. This is because the water does not pass through the diffusion medium causing masking of void space for the gas passage. Similarly the elimination of water flow through the diffusion medium will also reduce the attrition of the medium and its gradual fragmentation and structural deterioration.

The evaporative cooling process is effective in the exit tracks and water content of the membrane is maintained due to saturation of the air with water vapour.

Although embodiments of the present invention have been described in the context of water injection into a proton exchange membrane fuel cell, it will be understood that the same structures may be used to inject any fluid material to injection points on a field plate.

Other embodiments are within the accompanying claims.

The invention claimed is:

1. An assembly for a fuel cell, comprising:
    a fluid flow field plate having a field plate channel in a surface of the fluid flow field plate that extends across the surface in a pattern, the fluid flow field plate comprising a manifold for supplying water to the field plate channel, the field plate channel comprising a flow path that extends between entry and exit points of the field plate channel;

a distribution foil having distribution channels in a surface of the distribution foil, the distribution foil providing an interface between the manifold and different positions along the flow path between the entry and exit points;

a cover foil extending over the distribution foil to enclose the distribution foil channels and thereby form water injection conduits between the distribution foil and the cover foil, the water injection conduits each having a corresponding water injection conduit outlet, each water injection conduit outlet being over the field plate channel to thereby allow water to be injected directly into the field plate channel, wherein groups of water injection conduit outlets of the water injection conduits are configured to inject water at the different positions along the flow path of the field plate channel between the entry and exit points.

2. The assembly of claim 1, wherein the distribution channels comprise:
   a first series of channels extending to a first edge of the distribution foil;
   an array of channels, in communication with the first series of channels, forming a pressure distribution gallery; and
   a second series of channels, in communication with the array of channels, extending to a second edge of the distribution foil.

3. The assembly of claim 1, wherein a subset of the water injection conduit outlets are configured in a convergence structure that is adapted to focus water flow into the field plate channel.

4. The assembly of claim 3, wherein the convergence structure comprises a recess in an edge of the distribution foil.

5. The assembly of claim 4, wherein the recess comprises an arcuate cut out in the edge of the distribution foil.

6. The assembly of claim 1, wherein the distribution foil is formed from stainless steel.

7. The assembly of claim 1, wherein the distribution foil channels are chemically etched.

8. The assembly of claim 1, wherein the distribution foil channels terminate at first positions at the manifold.

9. An assembly for a fuel cell, comprising:
   a fluid flow field plate having field plate channels in a surface of the fluid flow plate that extend across the surface in patterns, the fluid flow field plate comprising a manifold for supplying water to a corresponding field plate channel, each field plate channel comprising flow paths that extend between entry and end points of a corresponding field plate channel;
   a distribution foil having distribution channels in a surface of the distribution foil, the distribution foil providing an interface between the manifold and different flow paths of a corresponding field plate channel between entry and end points of the corresponding field plate channel; and
   a cover foil co-extensive with a substantial part of the distribution foil to enclose at least part of lengths of the distribution foil channels to thereby form water injection conduits between the distribution foil and the cover foil, the water injection conduits each having a corresponding water injection conduit outlet, each water injection conduit outlet being over a corresponding field plate channel to thereby allow water to be injected directly into the corresponding field plate channel, wherein groups of water injection conduit outlets of the water injection conduits are configured to inject water at different flow paths of a corresponding field plate channel between entry and end points of the corresponding field plate channel.

10. The assembly of claim 9, wherein the distribution channels comprise:
    a first series of channels extending to first positions proximal to, or at, a first edge of the distribution foil;
    an array of channels, in communication with the first series of channels, forming a pressure distribution gallery; and
    a second series of channels, in communication with the array of channels, extending to second positions proximal to, or at, a second edge of the distribution foil.

11. The assembly of claim 9, wherein a subset of the water injection conduit outlets are configured in a convergence structure that is adapted to focus water flow into a corresponding field plate channel.

12. The assembly claims 9, further comprising:
    additional fluid flow field plates in a stack that includes the fluid flow field plate, each fluid flow field plate in the stack being associated with a corresponding membrane-electrode assembly.

13. The assembly of claim 12, wherein each fluid flow field plate in the stack is an anode fluid flow field plate or a cathode fluid flow field plate, and wherein each cathode fluid flow field plate has a distribution foil and a cover foil interposed between the each cathode fluid flow field plate and an associated cathode.

14. An assembly for a fuel cell, comprising:
    a fluid flow field plate having a field plate channel in a surface of the fluid flow field plate that extends across the surface in a pattern, the fluid flow field plate comprising a manifold for supplying water to the field plate channel, the field plate channel comprising flow paths that extend between entry and end points of the field plate channel;
    a membrane-electrode assembly (MEA) adjacent to the fluid flow field plate at an active area of the MEA;
    a distribution foil between the fluid flow field plate and the MEA, the distribution foil having distribution channels in a surface of the distribution foil, the distribution foil providing an interface between the manifold and different flow paths between the entry and end points; and
    a cover foil extending over the distribution foil to enclose the distribution foil channels and thereby form water injection conduits between the distribution foil and the cover foil, the water injection conduits each having a corresponding water injection conduit outlet, each water injection conduit outlet being over the field plate channel to thereby allow water to be injected directly into the field plate channel, wherein groups of water injection conduit outlets of the water injection conduits are configured to inject water at the different flow paths of the field plate channel between the entry and end points of the field plate channel.

* * * * *

UNITED STATES PATENT AND TRADEMARK OFFICE
CERTIFICATE OF CORRECTION

| | | |
|---|---|---|
| PATENT NO. | : 8,614,030 B2 | Page 1 of 1 |
| APPLICATION NO. | : 10/520579 | |
| DATED | : December 24, 2013 | |
| INVENTOR(S) | : Peter D. Hood et al. | |

It is certified that error appears in the above-identified patent and that said Letters Patent is hereby corrected as shown below:

In the Claims:

Column 8, Claim 12, Line 24 (approx.)

Delete "claims" and Insert -- of claim --

Signed and Sealed this
Twenty-second Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,614,030 B2  
APPLICATION NO. : 10/520579  
DATED : December 24, 2013  
INVENTOR(S) : Hood et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1760 days.

Signed and Sealed this

Twenty-second Day of September, 2015

Michelle K. Lee
*Director of the United States Patent and Trademark Office*